(12) United States Patent
Sasson et al.

(10) Patent No.: US 10,776,460 B2
(45) Date of Patent: Sep. 15, 2020

(54) PROACTIVE SECURITY SYSTEM BASED ON CODE POLYMORPHISM

(71) Applicant: KameleonSec Ltd., Caesaria (IL)

(72) Inventors: Efi Sasson, Kfar Tavor (IL); Jorge Myszne, Mountain View, CA (US); Ronen Tanne, Vancouver (CA)

(73) Assignee: KAMELEONSEC LTD., Caesaria (IL)

( * ) Notice: Subject to any disclaimer, the term of this patent is extended or adjusted under 35 U.S.C. 154(b) by 0 days.

(21) Appl. No.: 16/601,938

(22) Filed: Oct. 15, 2019

(65) Prior Publication Data

US 2020/0117774 A1 Apr. 16, 2020

Related U.S. Application Data

(60) Provisional application No. 62/745,937, filed on Oct. 15, 2018.

(51) Int. Cl.
*G06F 21/14* (2013.01)
*G06F 21/55* (2013.01)
*G06F 21/60* (2013.01)

(52) U.S. Cl.
CPC ............ *G06F 21/14* (2013.01); *G06F 21/554* (2013.01); *G06F 21/602* (2013.01); *G06F 2221/033* (2013.01)

(58) Field of Classification Search
CPC ....... G06F 21/602; G06F 21/554; G06F 21/14
USPC .......................................................... 726/23
See application file for complete search history.

(56) References Cited

U.S. PATENT DOCUMENTS

| 7,171,693 | B2 * | 1/2007 | Tucker | G06F 21/14 |
| | | | | 713/189 |
| 7,478,233 | B2 | 1/2009 | Olson et al. | |
| 7,587,595 | B2 | 9/2009 | Scarlata et al. | |
| 7,739,740 | B1 * | 6/2010 | Nachenberg | G06F 21/566 |
| | | | | 709/206 |
| 8,286,251 | B2 | 10/2012 | Eker et al. | |
| 8,884,757 | B2 | 11/2014 | Sasson et al. | |
| 8,997,226 | B1 * | 3/2015 | Call | G06F 21/552 |
| | | | | 726/22 |
| 9,390,601 | B2 | 7/2016 | Sasson et al. | |

(Continued)

OTHER PUBLICATIONS

Hruska, "DARPA, University of Michigan Team Up to Build "Unhackable" Chip," 2017, ExtremeTech, url: https://www.extremetech.com/extreme/261052-darpa-university-michigan-team-build-unhackable-chip.

(Continued)

*Primary Examiner* — Teshome Hailu
(74) *Attorney, Agent, or Firm* — M&B IP Analysts, LLC

(57) ABSTRACT

A method, and processor for securing a host platform of a computing device are presented. The method includes generating, by a security processor, a first graph based on at least a portion of executable code, wherein the executable code is executed by a main processor of the host platform; generating a metadata file based on the generated first graph; polymorphing the executable code based on the generated metadata file; generating a second graph based on the polymorphed code; creating slices of the polymorphed code; executing at least one slices of the created slices by the security processor, wherein the security processor is apart from the main processor; polymorphing the at least one of executed slice; and pairing the least polymorphed slice with the polymorphed code.

23 Claims, 5 Drawing Sheets

(56) References Cited

U.S. PATENT DOCUMENTS

| | | | |
|---|---|---|---|
| 9,767,270 | B2 | 9/2017 | Korman et al. |
| 2002/0016918 | A1 | 2/2002 | Tucker et al. |
| 2003/0226031 | A1 | 12/2003 | Proudler et al. |
| 2009/0328185 | A1 | 12/2009 | Berg et al. |
| 2015/0113602 | A1 | 4/2015 | Korman et al. |
| 2015/0193252 | A1 | 7/2015 | Scarlata |
| 2015/0339479 | A1* | 11/2015 | Wang .................... G06F 21/556 726/22 |
| 2016/0006750 | A1* | 1/2016 | Yang ....................... H04L 63/20 726/22 |
| 2016/0196431 | A1* | 7/2016 | Lu ......................... G06F 21/568 726/23 |

OTHER PUBLICATIONS

Moore, "Unhackable Computer Under Development with $3.6M DARPA Grant," Ann Arbor, Michigan, University of Michigan, 2019, url: https://news.umich.edu/unhackable-computer-under-development-with-3-6m-darpa-grant/.

The International Search Report and the Written Opinion of the International Searching Authority for PCT/US2019/056213, dated Feb. 6, 2020, ISA/RU, Moscow, Russia.

\* cited by examiner

PROACTIVE SECURITY SYSTEM BASED ON CODE POLYMORPHISM

CROSS-REFERENCE TO RELATED APPLICATIONS

This application claims the benefit of U.S. Provisional Application No. 62/745,937, filed on Oct. 15, 2018, the contents of which are hereby incorporated by reference.

TECHNICAL FIELD

The present disclosure relates to information cyber security systems, and to security computing platforms architectures using code or data polymorphism.

BACKGROUND

As computers have become more widely used and more pervasively networked, information, privacy, and financial losses, due to information security breaches, have dramatically increased as well.

Many advances have been made in recent years in the field of computer information security. Most of these security countermeasures technologies employed computer software to identify authorized users of a system, protect against virus infection, encrypt/decrypt data streams, prevent unauthorized registration and/or use of pirated software applications, or block malicious or surreptitious communications originating from a particular source. Nevertheless, unauthorized access to a particular computer system may often be obtained by exploiting various security flaws present in the program code of the countermeasure software itself. Additionally, unauthorized access may also occur with the theft of information or with reverse engineering of the code or data or the system to which the data relates.

Also, in the current computing world, if an exploit is found, it usually becomes available on any system, meaning that if an attacker breaks in into one system, the attacker can break into all systems of the same type, (i.e., breaking into one leads to breaking into all).

There are many threats to computing architectures directed to attack various functionalities (e.g., applications, processes, etc.) and/or resources (e.g., memory, network, processor, peripherals and the like). One example of family types of attacks trying to exploit the memory of the system is the memory corruption attack, also known as the zero days attack.

Memory corruption occurs in a computer program when the contents of memory pointers are modified due to programmatic behavior that exceeds the intention of the original programmer or program/language constructs. This is termed violating memory safety. When the corrupted memory contents are used later in that program, it leads either to a program crash or to unintended strange and bizarre program behavior, from the program programmer's or designer's perspective.

An attacker can execute a memory corruption attack by attacking the CPU's memory structure (e.g., stack, heap, text code, shared libs), causing a buffer overflow, exploiting the memory using return oriented programming (ROP), JIT-ROP, Blind-ROP and other memory corruption types of exploits, and building and triggering exploits by searching for gadgets in the memory or program code. Typically, CPU architectures are not designed with security features to protect their cores and memory. Alternatively, the security features may be mitigated by the attackers. Any security software (e.g., anti-virus system) can run after the CPU has restarted, thus, such software may not be able to protect against, at least, memory corruption attacks.

It would be, therefore, advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing a host platform of a computing device. The method comprises generating, by a security processor, a first graph based on at least a portion of executable code, wherein the executable code is executed by a main processor of the host platform; generating a metadata file based on the generated first graph; polymorphing the executable code based on the generated metadata file; generating a second graph based on the polymorphed code; creating slices of the polymorphed code; executing at least one slices of the created slices by the security processor, wherein the security processor is apart from the main processor; polymorphing the at least one of executed slice; and pairing the least polymorphed slice with the polymorphed code Certain embodiments disclosed herein also include a system for securing a host platform of a computing device. The system comprises a security processor; and a memory, the memory containing instructions that, when executed by the security processor, configure the system to: generate a first graph based on at least a portion of executable code, wherein the executable code is executed by a main processor of the host platform; generate a metadata file based on the generated first graph; polymorph the executable code based on the generated metadata file; generate a second graph based on the polymorphed code; create slices of the polymorphed code; execute at least one slices of the created slices by the security processor, wherein the security processor is apart from the main processor; polymorph the at least one of executed slice; and pair the least polymorphed slice with the polymorphed code.

Certain embodiments disclosed herein also include computing device comprising: a main processor; and a security processor; a memory, the memory containing instructions that, when executed by the security processor, configure the security processor to: generate a first graph based on at least a portion executable code, wherein the executable code is executed by a main processor of a host platform; generate a metadata file based on the generated first graph; polymorph the executable code based on the generated metadata file; generate a second graph based on the polymorphed executable code; create slices of the polymorphed executable code; execute at least one slices of the created slices by the security processor, wherein the security processor is apart from the main processor; polymorph the at least one of executed slice; and pair the least polymorphed slice with the polymorphed executable code.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
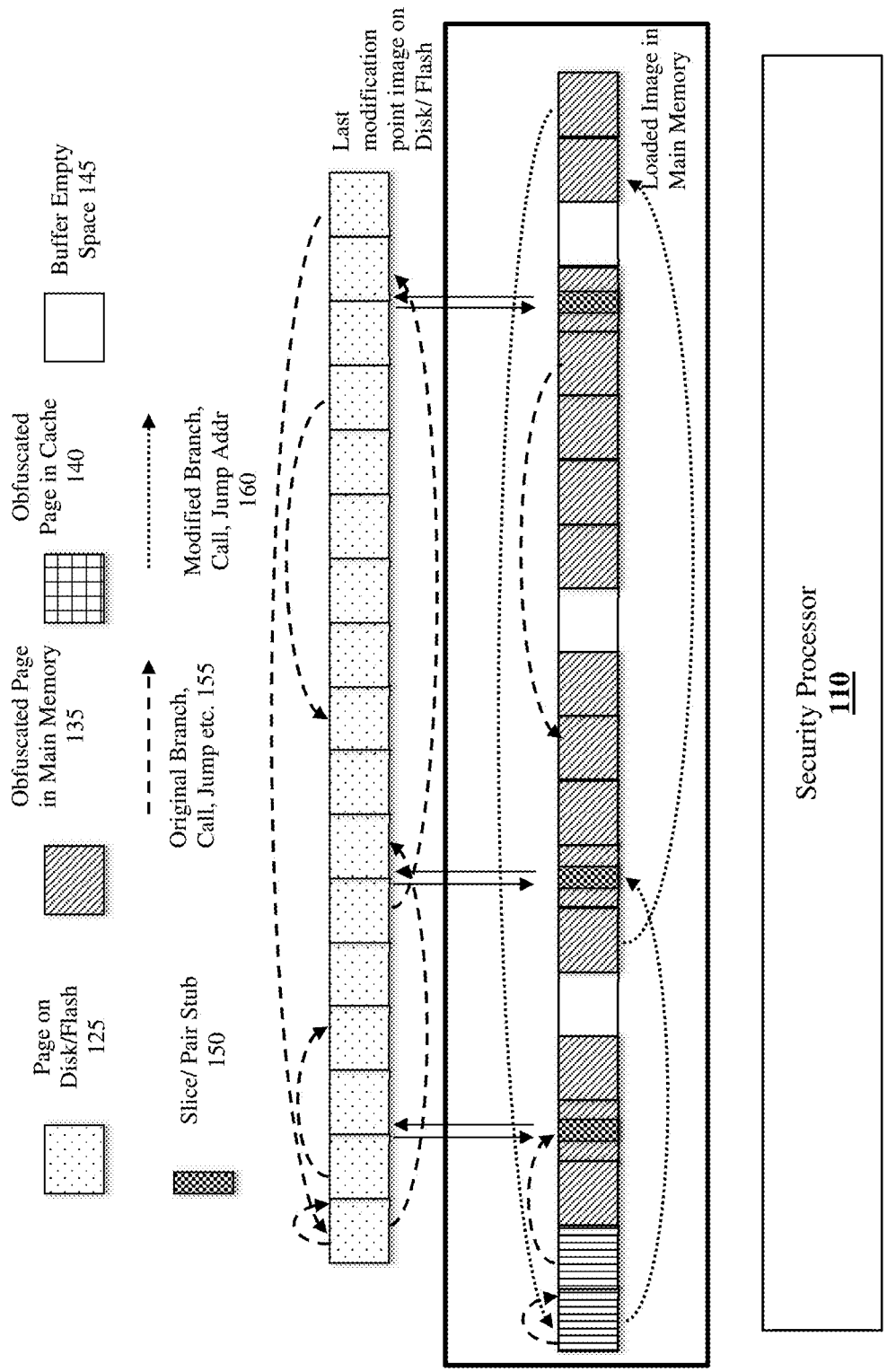
FIG. 1 is a block diagram showing the processing of executable code by a security processor according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein provide for a system and method that effectively counters the exploitation of security flaws in software applications, systems, and programs during their executions. The disclosed embodiments also effectively prevent unauthorized access to external systems or networks, and capture of identification, password and/or other data that may be used to gain access to a particular computer system.

The various disclosed embodiments are configured to secure host platforms against cyber security attacks. The host platform typically includes a memory and a processing circuity (e.g., a CPU). The protection is achieved by a security processor embedded in the host platform. The host platform is protected by, or may be embedded, in any computing device or a chipset including, but not limited to, a personal computer, a laptop computer, a tablet computer, a server, an IoT device, a computing cloud resource, a network element, a smartphone, an automotive system, an industrial device, an embedded system, and the like. In certain embodiment, the security processor may be configured to perform the functionality of the host platform. For example, the disclosed security processor may be embedded in the processing circuity and memory of a computing device, e.g., an IoT device, to perform their functions and processes.

As will be discussed in detail below, according to an embodiment, the security processor is configured to dynamically and proactively change, polymorph, inject, obfuscate, and/or mutate the code of the running application in the host platform. The disclosed embodiments provide security techniques, implemented by the disclosed embodiments, allowing for constant movement, changing the location of the code, or polymorphing the code in host platform's memory to prevent an attacker from being able to breach the computing device by using any kind of software exploits, including but not limited to, memory corruption, zero day exploits, unpatched exploits, and the like.

By performing all code polymorphism in runtime, the disclosed embodiments allow continuous changing or breaking of the attack surface of the host platform, thereby preventing from an attacker from penetrating the host platform. Specifically, the embodiments disclosed herein may protect the standard and or custom compiled code using a security processor that randomly alters the executable code of compiled software, while conserving the application's original operational and functional characteristics.

In an embodiment, the security processor is implemented as a system on a chip (SoC) and function as a co-processor coupled to the host platform's main processor. When the security processor functions as a co-processor, polymorphing the code is proactively performed at random times, pre-defined intervals, or based on analysis of the code. Such analysis does not require external compiler within source code compilation procedure.

The polymorphing of the code results in a polymorphed code whose original application source code becomes statistically impossible to retrieve. Additionally, each polymorphed copy of the application randomly differs from any other copy, thus precluding the possibility of generating a patch, crack, or exploit from the polymorphed code.

According to one embodiment, in order to increase the security of the computing platform and its entropy, the security processor and the host platform may be proactively paired so that the specific polymorphed copy of the software only runs on the platform with that specific security processor. With the embodiments herein, breaking into one host platform does not guarantee subsequent breaking into other similar platforms, since each platform is paired to a specific security processor, and thus the polymorphic copy is different in operation with the specific security processor.

As an added layer of protection, the embodiments disclosed herein also detect memory manipulation at runtime to further protect the host platform. Such detection is performed by additional logic added to a first graph generated based on the received executable code, after analysis or disassembly of the original binary of the application, within the security processor. The additional logic may be, for example, honey pot, hooking, and the like. The first graph with the added logic is polymorphed, by the security processor, to create the second graph. When the security processor controls the host platform, the security processor is configured to randomly re-shuffle the platform's memory according the second graph and update the code to maintain the functionality of the host platform.

The embodiments disclosed herein may more effectively prevent unauthorized reproduction, access and/or use of the code. This may be achieved without external source compiler intervention and while conserving the protected code's application's or process's original operational and functional characteristics.

FIG. 1 is an example schematic diagram showing the processing of code by the security processor 110. The code being processed by the processor 110 may include any processor instructions, such as standard executable code (e.g. binary compiled code), Just-in-Time script code, and the like. The code being processed by the security processor 110 will be referred to hereinafter as executable code. In operation, the security processor 110 is configured to receive and analyze the executable code, and generate a first graph of the executable code. The executable code may be received from a disk (or other type of storage) that is loaded by a user, or from binary code previously stored in the main memory.

The generation of a first graph is a commonly used method in programming or debugging and it is used to analyze the executable code's flow and the dependencies between the different functions, libraries and or different parts of the executable code. The first graph may be generated in advance.

The information of a first graph is used to generate a metadata file that will accompany the executable code. In other words, the metadata file may be retrieved from the analyzed executable code. The security processor 110 is configured to use this metadata to polymorph the executable code and or inject new executable code. Polymorphing the executable code means that such code will be modified, obfuscated and/or lines will be added or additional code injected, such that the executable code mutates, while keeping the original algorithm context intact, or adding functionality to the original executable code. Such polymorphing includes adding functionality to the executable code to make the polymorphed code change itself each time the polymorphed code being executed, but the function or outcome of the respective executable code (its context) remain the same. For example, with a binary code for performing arithmetic: '1+3' and '6−2', both achieve the same result, while using different values and operations.

While the polymorphed binary code changes from copy to copy, the second graph may be valid for all of the copies and, thus, needs to be protected. Therefore, the first graph is generated inside the security processor 110 and it is not stored outside the security processor as plain text. The second graph representing the above-described polymorphing of the analyzed binary code is then created. Both graphs, when created, are stored in an encrypted form. The generation of the first and second graphs are further discussed with reference to FIGS. 4 and 5.

In FIG. 1, executable code stored on a host platform's storage (e.g. disk) 125 is also represented, with a plurality of pages on the storage 125 forming the memory space. The original function calls 155 among the memory's pages 125 may also be included in a first graph. The executable code may be stored on a host platform's storage (e.g., disk), which may then be loaded to a main memory 135.

A second graph showing executable code structure stored in the memory is also represented. Here, both obfuscated page in a main memory 135 and obfuscated page in a cache memory 140 are stored in the main memory 135. The main memory 135 may also include buffer space 145. Modified function calls 160 exist among the pages in the main memory 135 and/or cache memory 140. As will be explained below, slices 150 of the pages in memory 135 and cache 140, as well as modified function calls 160 are also included in a second graph. When the contents of the memory 135 are changed, the contents of the cache 140 may be updated as well using, for example, cache coherence mechanism.

In an embodiment, when a new polymorphic copy is generated and ready, the binary code is sliced into N (N is an integer number) pieces where one or more of those slices, or the slice logic functionality 150, are executed in the security processor 110, while the rest are executed on a main processor of the host platform. This way, every time one of the slices 150 that need to be executed in the security processor 110 is being called, the control or execution of host platform is transferred to the security processor 110 (from the platform's main processor), and a new polymorphed version is created, sliced, and loaded. In an embodiment, any new polymorphed version is paired with the host platform.

Specifically, when the slices 150 have been polymorphed, such slices are paired back with the initially polymorphed code that has not been executed by the security processor 110.

As one or more slices of the polymorphed code are being run in the security processor, the copy of the software and the slice 150 in the security processor have to be in synchrony, preventing the executable code from running on a different system. Any change in such slice(s) would break this synchronicity and the host platform would have to be re-paired.

Figure 2:
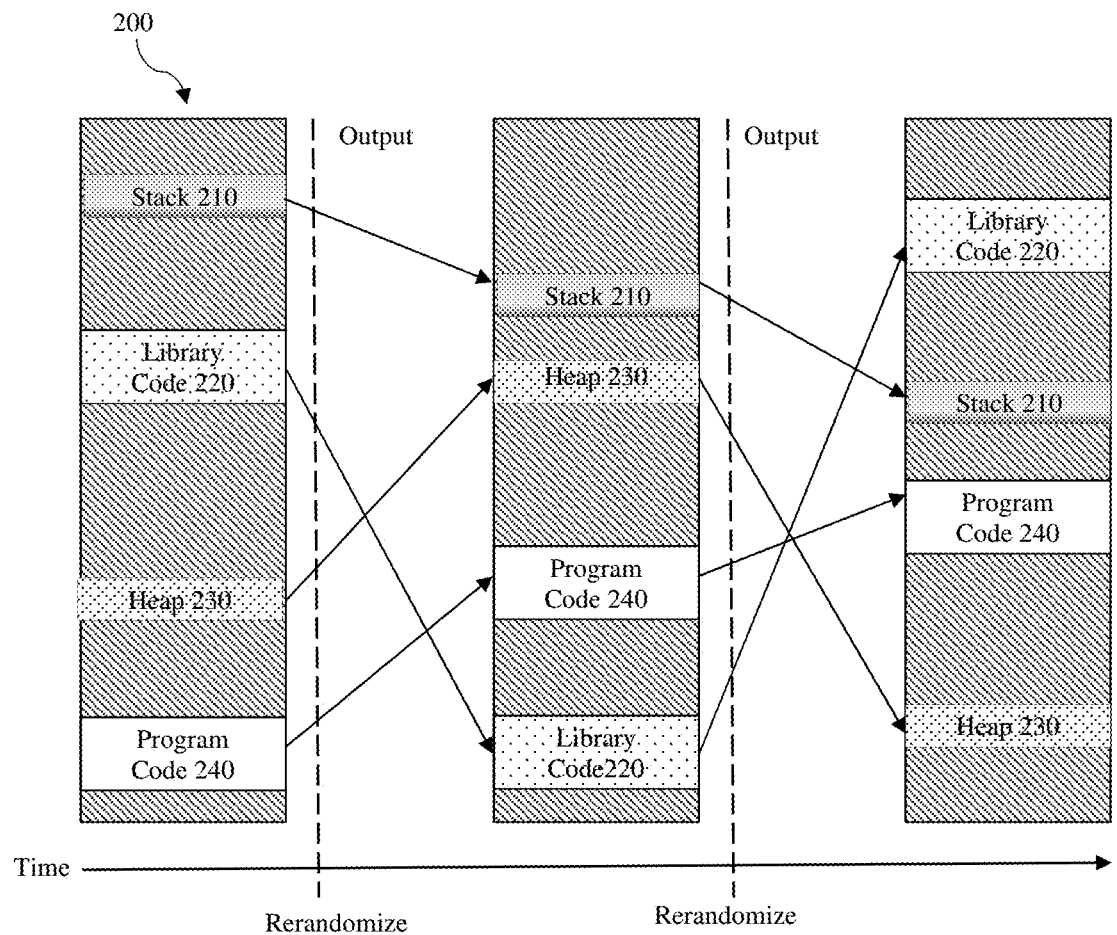
FIG. 2 is a functional diagram of a program memory showing the randomization and reshuffling of contents stored in the memory according to an embodiment.

FIG. 2 is a functional diagram of a program memory showing the randomization and reshuffling of the executable code or data stored in the memory, according to an embodiment. In FIG. 2, a memory structure 200 of the main memory (e.g., memory 340, FIG. 3) is shown. The memory structure 200 includes many segments such as stack 210, library 220, heap 230, and program 240 that are stored in various locations in a main memory of the host platform.

In addition to slicing and pairing, the security processor 110 may also proactively re-shuffle the segments 210-240 of the data stored in the main memory from time to time, thereby preventing an attacker from knowing where the desired data is located. The reshuffled data may include executable code, application data, program data, the like. That is, over a period of time, the memory structure 200 of the locations where the segments 210-240 are stored within the main memory is re-shuffled (re-arranged) in a random or periodic manner. This "rerandomization" may occur regularly over time (i.e., in a periodic manner).

Alternatively, the shuffling or rerandomization may also be in a proactive manner, upon detection, which is performed by additional executable code insertion, that there may be malware seeking to access the host platform 100 or the main memory to gain vulnerabilities information on a particular segment 210-240, or gain access on the memory or other components of the host platform. As a second alternative, the shuffling or rerandomization may occur whenever it is detected that a particular data segment 210-240 is likely to execute a detected malware.

Moreover, by re-shuffling the data stored in the main memory, the known vulnerabilities and zero-day exploits are changed from their current location in the memory. This provides the host platform with resilience to several common attack techniques, such as, but not limited to, buffer overflow, cross-site scripting, malware attacks, and so on.

For example, in buffer overflow, a stack or a functional buffer may overflow because of improper safety within the programming language and the CPUs' architecture, which may not be built for security. Also, exploits or malwares may search for gadgets (e.g., vulnerabilities within the host platform) in order to build exploits, or additional malware that takes advantage of vulnerabilities found by the initial malware. However, re-shuffling the locations where the segments are stored in the main memory with a separated security processor in a proactive way, would harden the security features of the host platform.

The shuffling of the memory, as well as the proactive polymorphing, slicing and pairing of the executable code, are all controlled and managed by the security processor 110. Here, the entire protection of the host platform is based on the fact that the formula (or recipe) for this process is kept secret. This secrecy of the formula can only be preserved if the process is performed by a dedicated and specific piece of hardware (i.e., the security processor 110). The formula is also polymorphed and, thus, cannot be known when being stored or processed by a different processor or hardware logic. In contrast, similar solutions may be controlled and managed by a dedicated piece of software. Dedicated software-only management of formula or recipe security has been demonstrated as insufficiently secure, leading to the formula or recipe being breached.

Figure 3:
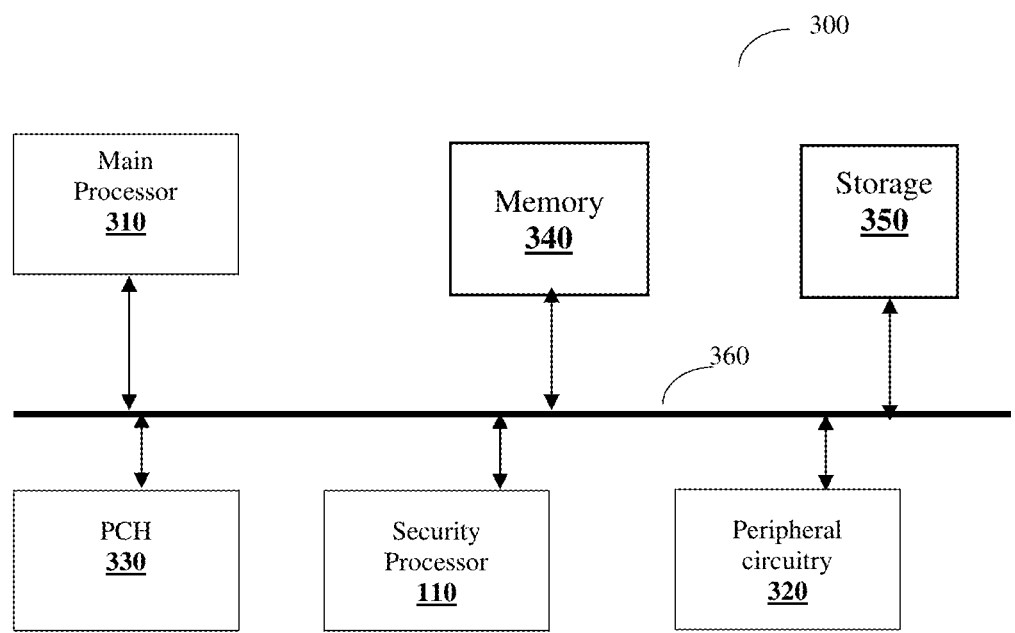
FIG. 3 is an example block diagram of a host platform structured to host the security processor according to an embodiment.

FIG. 3 shows an example block diagram illustrating the architecture of a host platform 300 including the security processor 110 according to an embodiment. The host platform 300 also includes a main processor 310, a peripheral circuitry 320, a platform control hub (PCH) 330, a memory 340, and a storage 350. The various elements of the security processor 110 may be inter-connected using a bus 360. The bus 360 may include PCIe bus, a SPI bus, a DDR link, and the like or combination thereof. The PCH 330 allows the connectivity between the various elements of the host platform 300. Such connectivity may be achieved over a PCIe bus or other physical interfaces. The main processor 310 may include an application processor.

The main processor 310 is a processing circuitry that may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), System-on-a-Chip systems (SOCs), general-purpose microprocessors, microcontrollers, digital signal processors (DSPs), graphic processing units (GPUs), network processors, artificial intelligence processors, and the like, or any other hardware logic components that can perform calculations or other manipulations of information.

The memory 340 may be a main memory of the host platform 300. The memory 340 may be volatile (e.g., RAM, DRAM, etc.). In one configuration, computer readable instruction, software or executable code (collectively referred to as software) on which the polymorphism is stored in the memory 340. The software, when executed, causes the main processor 310 to perform the various processes or applications that the host platform supports.

Software shall be construed broadly to mean any type of instructions, whether referred to as software, firmware, middleware, and/or microcode. Instructions may include code (e.g., in source code format, just in time scripts, binary code format, executable code format, or any other suitable format of code).

The storage 350 may be magnetic storage, optical storage, non-volatile memory, and the like, and may be realized, for example, as flash memory or other memory technology, CD-ROM, Digital Versatile Disks (DVDs), or any other medium which can be used to store the desired information. Such information may include, for example, the encrypted generated graph, and so on.

The peripheral circuitry 320 allows the host platform 300 to communicate with various peripheral components including, but limited to, network components.

The security processor 110 may be realized as one or more hardware logic components and circuits. For example, and without limitation, illustrative types of hardware logic components that can be used include FPGAs, ASICs, ASSPs, SOCs, DSPs, general-purpose microprocessors, hardware logic state machines, microcontrollers, and its functionality can be implemented by hardware logic and the like, or any other hardware logic components that can perform calculations or other manipulations of information. In an embodiment, the security processor 110 can be configured to execute embedded software. The software, when executed, causes the security processor 110, to perform the embodiments disclosed herein. The embedded software shall be construed broadly to mean any type of instructions, whether referred to as software, firmware, middleware, and/or microcode. In an embodiment, the security processor 110 may include memory (not shown) or use the memory 340 to store the embedded software.

The security processor 110 can be configured to execute its internal functionality by hardware logic implementation such as finite state machines, which can also use memory.

In an embodiment, the memory 340 may include a pre-stored executable code. The security processor 110 may receive the executable code from the memory 340 via the PCH 330, and generate a first graph based on the executable code.

Next, the security processor 110 is configured to generate a metadata based on the generated graph, and to polymorph the executable code based on the generated metadata. The security processor 110 is then configured to generate a second graph based on the polymorphed executable code. This second graph may be stored in the memory 340.

In an embodiment, the security processor 110 is configured to analyze the executable code to determine if such code includes gadgets. In such an embodiment, the security processor 110 would polymorph only polymorphed code determined to include gadgets. It should be noted that executable code shall be construed broadly as defined above. Further, executable code may be of any program, process, and/or application executed by the main processor over the host platform. It should be noted that the polymorphism techniques discussed herein are noted limited to executable code, but also applicable to application data, program data, and the like.

The security processor 110 is further configured to generate slices (e.g., slices 150, FIG. 1) of the polymorphed code. In an embodiment, at least one of the slices is executed in the security processor 110 apart from the main processor 310. The remaining polymorphed code and the remaining sliced parts are not executed by the security processor 110, but rather executed by the main processor 310.

Thereafter, the security processor 110 is further configured to polymorph the at least one of the slices being executed by therein. This polymorphed slice is paired back with the polymorphed code.

According to another embodiment, the security processor 110 is also configured to re-shuffle a plurality of segments (e.g., segments 210-240, FIG. 2) of data stored in the memory 340. The locations of the segments stored in the memory 340 relative to each other are rearranged. The re-shuffling may take place on a periodic basis, a random basis, or upon receiving information that the host platform (or the respective computing device) is subject to a cyber-attack on its vulnerabilities. Such an attack may be, for example, malware trying to gain information on the system's vulnerabilities, or one of the segments 210-240 and the main processor 310 is about to execute the malware.

It should be understood that the embodiments described herein are not limited to the specific architecture illustrated in FIG. 3, and other architectures may be equally used without departing from the scope of the disclosed embodiments. Specifically, the security processor 110 may include a memory (e.g., memory 340) and performed the processes executed by the main processor. Thus, in such a configuration, the security processor 110 is the main processor.

Figure 4:
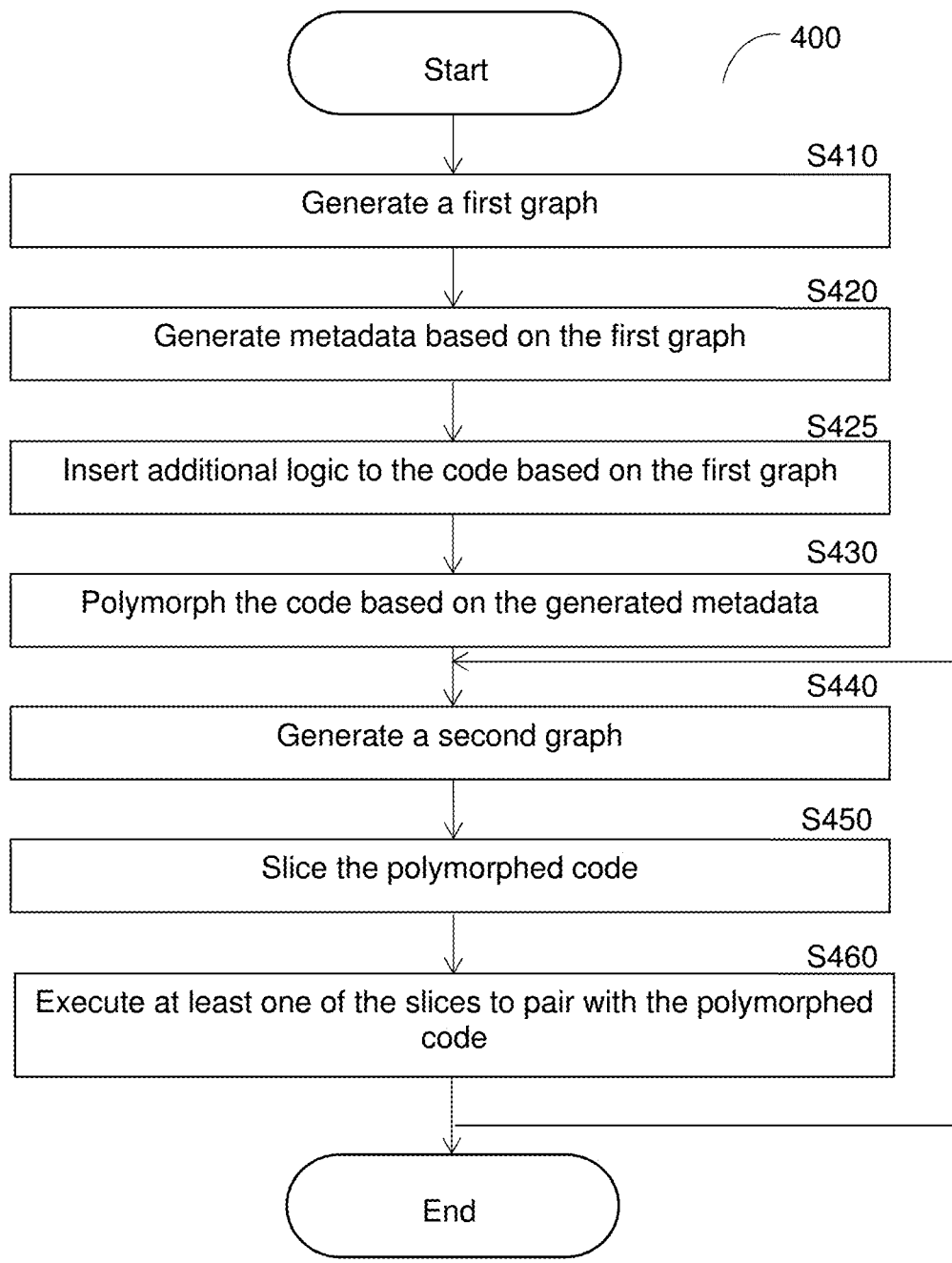
FIG. 4 is an example flowchart illustrating a polymorphism-based method for protecting against cyberattacks according to an embodiment.

FIG. 4 is an example flowchart 400 illustrating a method for protecting against cyberattacks based on executable code polymorphism according to an embodiment. The method may be performed by the security processor. The disclosed method is also applicable for performing data (e.g., application or program data) polymorphism.

Figure 5:
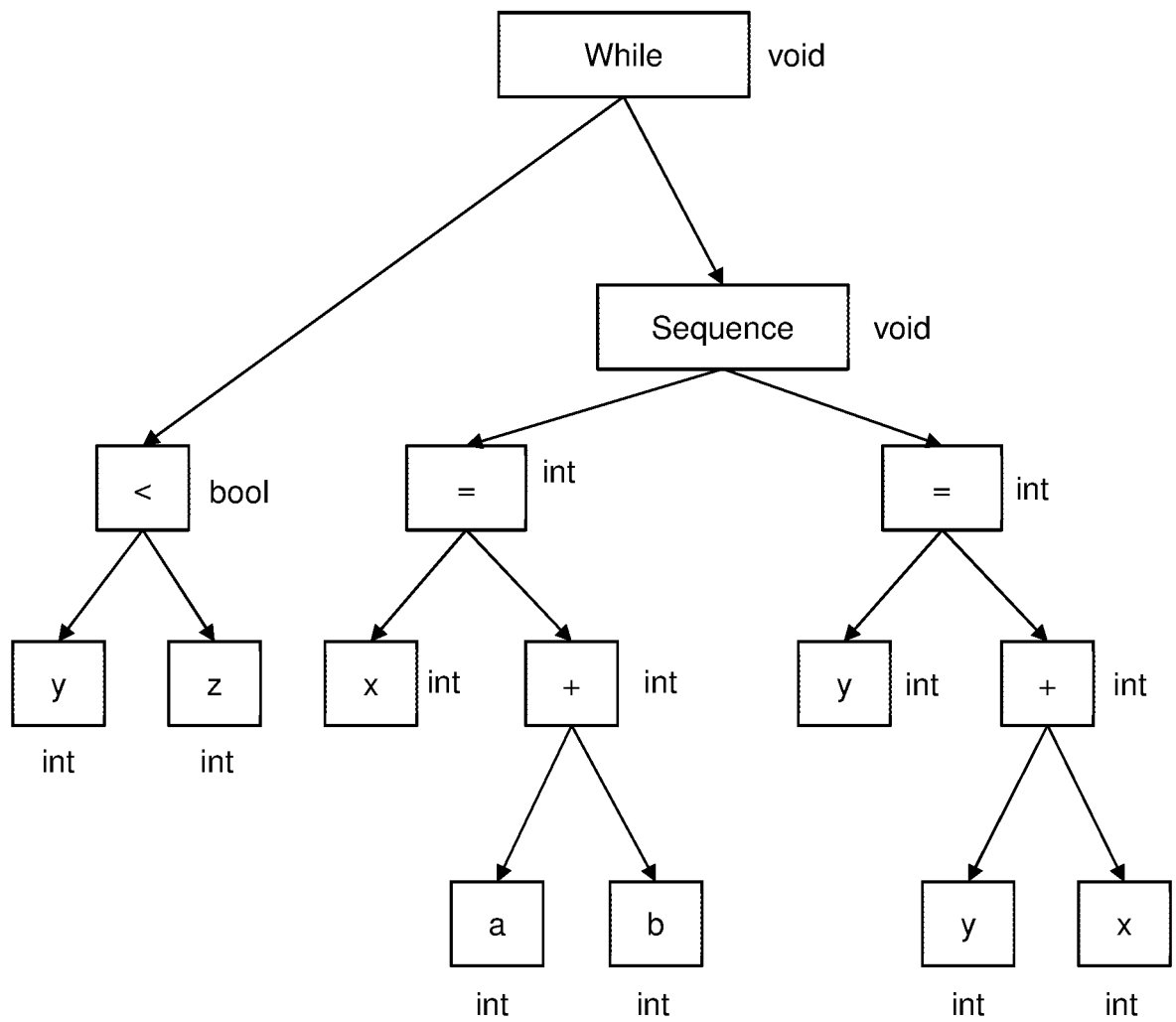
FIG. 5 is an example of a graph generated as part of the method of FIG. 4.

At S410, a first graph is generated based on the executable code. The executable code may be obtained from a main memory of a host platform. The executable code may be of any process, program, or application executed by a main processor hosted in the platform. FIG. 5 shows an example graph generated for the following exemplary code:

while (y<z)) {
  x=a+b;
  y=y+x{

It should be noted that the embodiments disclosed operate on executable code (e.g., compiled binary code) and the above exemplary code is not such, but is utilized to demonstrate the disclosed embodiments. Further, the processing, and hence the generation of the graph can be performed on a portion of the executable code including the memory (during runtime of the executable code).

At S420, a metadata file is created based on the generated first graph. The metadata file includes information on variable, parameters, loops, and the like included in the executable code.

Optionally, at S425, additional logic is added to the received executable code based on the generated first graph. Such logic may be utilized, for example, to detect malware code, manipulation of memory at runtime, and so on. For example, the additional logic may include a honey pot.

At S430, the executable code (including the additional logic, when added) is polymorphed based on the generated metadata file. In an embodiment, the polymorphing of the executable code includes modifying, obfuscating, or adding of lines so that the received executable code mutates, while a function of the compiled executable code remains unchanged. Some examples utilized for the executable code polymorphism includes, for example, inserting an extract jump call at the beginning of a function; inserting extra space between blocks of code; changing or duplicating location of functions in the memory; substituting intra or inter atomic instructions; intra or inter reordering of basic block code; intra register re-assignment; intra reordering of register preservation code; and the like. It should be emphasized that in the above embodiments for polymorphing the executable code, the context of the application, process, and/or algorithm implemented using the executable code remains unchanged.

At S440, a second graph is generated based on the polymorphed executable code. This second graph may be encrypted and stored in a memory accessible by the security processor. The second graph may also be stored with the security processor.

At S450, slices of the polymorphed code are created. In an example, the polymorphed code is sliced at certain locations, based on the polymorphed code's logic. For example, the polymorphed code can be sliced at a loop block. In an embodiment, the slices can be used as a hooking mechanism for the polymorphism actions or for adding system logic or functionality, such as process preceptors. In another embodiment, the slices can be used in order to check the run time integrity of the polymorphism. In yet another embodiment, sliced can be used for injecting more logic for hooking and security activities in parallel to the application functionality.

At S460, the at least one of the executed slices is executed by the security processor. This is performed to polymorph the at least one slice and pair the executed slice(s) with the polymorphed code. The security processor may execute one of the slices apart from a main processor.

In an embodiment, a plurality of second graphs can be generated. Each new second graph is generated by repeating S440 through S460.

In some embodiments, a plurality of memory segments, including data maintained in the main memory are re-shuffled. In an embodiment, memory re-shuffling includes randomly re-shuffling at least one location of any data structure executed by the main processor and stored in the main memory. As demonstrated in FIG. 2, such data structure may include a stack, a library, a heap, and program code. The program code may include executable code as defined herein below.

The memory re-shuffling further includes re-arranging the locations of the segments stored in the main memory relative to each other. As mentioned above, the re-shuffling may take place on a periodic basis, at random times, or upon analysis determining that the host platform is subject to a cyberattack on its vulnerabilities. It should be that the memory re-shuffling may occur independent of the executable code polymorphism the compiled executable code.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing a host platform of a computing device, comprising:
    generating, by a security processor, a first graph based on at least a portion of executable code, wherein the executable code is executed by a main processor of the host platform;
    generating a metadata file based on the generated first graph;
    polymorphing the executable code based on the generated metadata file;
    generating a second graph based on the polymorphed code;
    creating slices of the polymorphed code;
    executing at least one slices of the created slices by the security processor, wherein the security processor is apart from the main processor;
    polymorphing the at least one of executed slice;
    pairing the least polymorphed slice with the polymorphed code; and
    re-shuffling a plurality of segments including data stored in a main memory of the host platform, wherein locations of the segments stored in the main memory relative to each other are rearranged.

2. The method of claim 1, wherein polymorphing the executable code further comprises at least: obfuscating the executable code, while maintaining a context of the executable code unchanged.

3. The method of claim 1, further comprising:
    encrypting and storing at least the second graph within a memory accessible by the security processor.

4. The method of claim 1, further comprising:
    repeatedly polymorphing the at least one executed slice.

5. The method of claim 1, wherein re-shuffling the plurality of segments further comprises:
    randomly re-shuffling one of a location of any data structure executed by the main processor, wherein the data structure is one of: a stack, a library, a heap, and program code stored in the main memory, wherein the program code includes executable code.

6. The method of claim 1, wherein re-shuffling the plurality of segments is repeated periodically or performed randomly.

7. The method of claim 1, wherein the re-shuffling occurs upon detection of any one of: one of the plurality of segments data is likely to be attacked by a detected malware and one of the plurality of data segments is likely to execute a detected malware.

8. The method of claim 1, wherein the at least one portion of executable code resides in a main memory of the host platform and being retrieved at runtime.

9. The method of claim 8, wherein the security processor is coupled to the main processor and hosted on the host platform.

10. The method of claim 1, wherein the computing device includes: a server, a personal computer, a handheld device, an internet of things (IoT) device, an automotive device, an industrial, an embedded system.

11. A non-transitory computer readable medium having stored thereon instructions for causing a processing circuitry to execute a process for securing a host platform of a computing device, comprising:
    generating, by a security processor, a first graph based on at least a portion of executable code, wherein the executable code is executed by a main processor of the host platform;
    generating a metadata file based on the generated first graph;
    polymorphing the executable code based on the generated metadata file;
    generating a second graph based on the polymorphed code;
    creating slices of the polymorphed code;
    executing at least one slices of the created slices by the security processor, wherein the security processor is apart from the main processor;
    polymorphing the at least one of executed slice;
    pairing the least polymorphed slice with the polymorphed code; and
    re-shuffling a plurality of segments including data stored in a main memory of the host platform, wherein locations of the segments stored in the main memory relative to each other are rearranged.

12. A system for securing a host platform of a computing device, comprising:
    a security processor; and
    a memory, the memory containing instructions that, when executed by the security processor, configure the system to:
    generate a first graph based on at least a portion of executable code, wherein the executable code is executed by a main processor of the host platform;
    generate a metadata file based on the generated first graph;
    polymorph the executable code based on the generated metadata file;
    generate a second graph based on the polymorphed code;
    create slices of the polymorphed code;
    execute at least one slices of the created slices by the security processor, wherein the security processor is apart from the main processor;
    polymorph the at least one of executed slice;
    pair the least polymorphed slice with the polymorphed code; and
    re-shuffle a plurality of segments including data stored in a main memory, wherein locations of the segments stored in the main memory relative to each other are rearranged, wherein the main memory is part of the host platform.

13. The system of claim 12, wherein polymorphing the executable code further comprises at least: obfuscating the executable code, while maintaining a context of the executable code.

14. The system of claim 12, wherein the system is further configured to:
    encrypt and store at least the second graph within a memory accessible by the security processor.

15. The system of claim 12, wherein the system is further configured to:
repeatedly polymorph the at least one executed slice.

16. The system of claim 11, wherein the system is further configured to:
randomly reshuffle one of a location of any data structure executed by the main processor, wherein the data structure is one of: a stack, a library code, a heap, and program code stored in the memory to a different location.

17. The system of claim 16, wherein the re-shuffling is repeated periodically and or randomly.

18. The system of claim 16, wherein the re-shuffling occurs upon detection of any one of: one of the plurality of segments data is likely to be attacked by a detected malware and one of the plurality of data segments is likely to execute a detected malware.

19. The system of claim 16, wherein the at least one portion executable code resides in a main memory of the host platform and retrieved at runtime.

20. The system of claim 12, wherein the system is coupled to the main processor and hosted on the host platform.

21. The system of claim 12, wherein the computing device includes: a server, a personal computer, a handheld device, an internet of things (IoT) device, an automotive device, an industrial device, an embedded system.

22. A computing device, comprising:
a main processor; and
a security processor;
a memory, the memory containing instructions that, when executed by the security processor, configure the security processor to:
generate a first graph based on at least a portion executable code, wherein the executable code is executed by a main processor of a host platform of the computing device;
generate a metadata file based on the generated first graph;
polymorph the executable code based on the generated metadata file;
generate a second graph based on the polymorphed executable code;
create slices of the polymorphed executable code;
execute at least one slices of the created slices by the security processor, wherein the security processor is apart from the main processor;
polymorph the at least one of executed slice;
pair the least polymorphed slice with the polymorphed executable code; and
re-shuffle a plurality of segments including data stored in a main memory, wherein locations of the segments stored in the main memory relative to each other are rearranged, wherein the main memory is part of the host platform.

23. The system of claim 22, wherein the computing device includes: a server, a personal computer, a handheld device, an internet of things (IoT) device, an automotive device, an industrial device, and an embedded system.

* * * * *